United States Patent
Nakabayashi et al.

(10) Patent No.: US 6,377,015 B1
(45) Date of Patent: Apr. 23, 2002

(54) VOICE COIL MOTOR CONTROL APPARATUS FOR USE IN DISK DRIVES

(75) Inventors: Yoichi Nakabayashi, Ome; Katsuhiko Kaida, Nishitama-gun, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/654,473

(22) Filed: Sep. 1, 2000

(30) Foreign Application Priority Data

Sep. 1, 1999 (JP) .......................................... 11-247914

(51) Int. Cl.[7] ................................................ G05F 1/10
(52) U.S. Cl. ....................... 318/650; 318/254; 318/801; 318/811; 318/439; 318/459; 318/500; 318/442
(58) Field of Search .................................. 318/254, 801, 318/811, 439, 459, 500, 442, 455, 109, 650

(56) References Cited

U.S. PATENT DOCUMENTS

| | | | |
|---|---|---|---|
| 5,808,438 A | 9/1998 | Jeffrey | |
| 6,043,618 A | * 3/2000 | Kawagoshi | 318/254 |
| 6,054,825 A | * 4/2000 | Hayner | 318/459 |

* cited by examiner

*Primary Examiner*—Karen Masih
(74) *Attorney, Agent, or Firm*—Pillsbury Winthrop

(57) ABSTRACT

Disclosed herein is a system for applying a power-supply voltage to the voice coil control circuit provided in a disk drive and designed to drive the head actuator provided in the disk drive. The power supply circuit of the disk drive outputs a voltage that corresponds to the power-supply voltage applied from a host system. A voltage step-up circuit is provided, which increases the output voltage of the power supply circuit. A switching circuit is provided, which selects the increased voltage output from the voltage step-up circuit when a large current needs to be supplied to the voice coil motor incorporated in the disk drive. The switching circuit selects the output voltage of the power supply circuit when a relatively small current needs to be supplied to the voice coil motor.

10 Claims, 5 Drawing Sheets

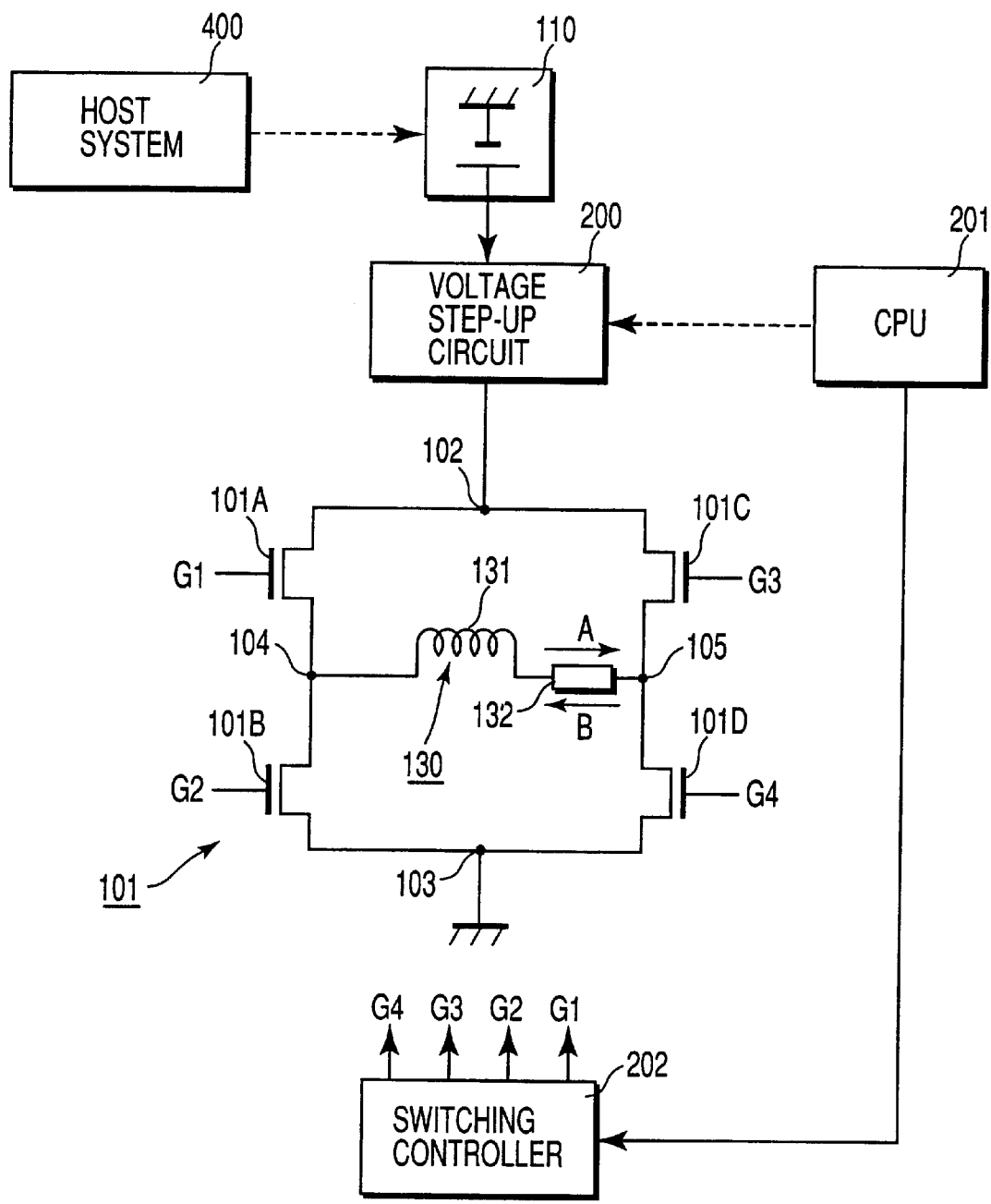
F I G. 1

VOICE COIL MOTOR CONTROL APPARATUS FOR USE IN DISK DRIVES

CROSS-REFERENCE TO RELATED APPLICATIONS

This application is based upon and claims the benefit of priority from the prior Japanese Patent Application No. 11-247914, filed Sep. 1, 1999, the entire contents of which are incorporated herein by reference.

BACKGROUND OF THE INVENTION

The present invention relates to a voice coil motor control apparatus which is designed for use in a disk drive in which the head actuator driven by a voice coil motor moves a head in a radial direction of a disk, and which supplies an electric current to the voice coil motor to control the voice coil motor.

A hard disk drive incorporates a hard disk, a magnetic head, a rotary actuator, and a voice coil motor (VCM). The head records data on the hard disk. The head is mounted on the actuator. The voice coil motor drives the actuator. When driven, the actuator moves the head in the radial direction of the hard disk until the head reaches a target position (i.e., a target track). Moving the head to the target position is known as "seek operation." Positioning the head at a position in the target track is known as "track following operation" or "positioning operation."

FIG. 5 shows the major components of the conventional VCM control circuit incorporated in a disk drive. As shown in FIG. 5, the VCM comprises a VCM drive circuit 101. The VCM drive circuit 101 has a switch that comprises four FETs (Field Effect Transistors) 101A to 101D. The FETs 101A to 101D are connected, forming an H-type bridge. The FETs 101A to 101D are turned on or off in accordance with switch control signals (i.e., gate control signals) G1 to G4. Each FET can control an electric current by virtue of on-resistance. The node 102 of the FETs 101A and 101C is connected to the power supply circuit 110 of the disk drive. The node 103 of the FETs 101B and 101D is connected to the ground. The power supply circuit 110 usually applies a voltage to the VCM drive circuit 101. This voltage is of the same level as the power-supply voltage applied from a host system (e.g., a personal computer). A series circuit is provided between and connected to the node of the FETs 101A and 101B and the node of the FETs 101C and 101D. The series circuit comprises the coil (VCM coil) 131 and sense resistor 132 of a VCM 130. The VCM 130 is incorporated in a head actuator.

To supply a current to the VCM coil 131 to make the VCM 130 generate a drive force, the FETs 101A and 101D are turned on, while the FETs 101B and 101C are turned off, thereby supplying a current in the direction of arrow A. To supply a current in the opposite direction of arrow B, the FETs 101A and 101D are turned off and the FETs 101B and 101C are turned on.

The current flowing in the VCM coil 131 (i.e., VCM current) has a value (I) which is determined as follows:

$$I=(VP-VB)/(RC+RS+RF)$$

where VP is the output voltage of the power supply circuit 110, VB is the back electromotive force of the VCM 130, RC is the resistance of the VCM coil 131, RS is the resistance of the sense resistor 132, and RF is the sum of the on-resistances of two FETs.

The value (I) of the VCM current determines the speed of the head actuator. That is, the value (I) determines the speed at which the head moves in the disk drive.

The direction in which the VCM current flows determines the direction in which the actuator moves. It ultimately determines the direction in which the head moves (toward the innermost track or toward the outermost track.) Hence, the direction and speed in and at which the head moves can be controlled by changing the direction in which the VCM current flows and the magnitude of the current.

The VCM current can be detected by measuring the voltage generated across the sense resistor 132. Hence, the speed of the head can be controlled by changing the on-resistance of each FET in accordance with the voltage across the sense resistor 132, or the VCM current determined by the voltage. The on-resistance of each FET is determined by the gate voltage of the FET. The gate voltage is, in-turn, determined by the output (DAC) of a digital/analog converter, which corresponds to the control value corresponding to a target VCM current.

As indicated above, the conventional VCM control circuit uses the power supply of the disk drive. In other words, the power supply of the host system is used as the VCM voltage source in the conventional VCM control circuit. As pointed out above, the value (I) of the VCM current is determined by four factors, that is, the power-supply voltage, the resistance of VCM coil 131, the resistance of sense resistor 132, and the on-resistance of each FET. Note that the power-supply voltage, the resistance of VCM coil 131 and the resistance of sense resistor 132 are constant at a specific temperature. The VCM current is therefore controlled by changing the on-resistances of two FETs remain on. The VCM current is maximal when the output (DAC) of the digital/analog convertor represents a control value that minimizes the on-resistance of each FET.

In most cases, the maximum current is made to flow in the VCM coil 131 during the seek operation, wherein the head moves for a long distance. In the seek operation, the head moves over the disk, from the innermost track to the outermost track, or vice versa.

In the host system, the power-supply voltage may be switched to a low voltage to save electric power, in the low power-consumption mode. In this case, the output voltage of the power supply circuit 110 (i.e., the power-supply voltage for the VCM) is switched to a low voltage in the disk drive, too. As a result, the maximum current supplied to the VCM 130 decreases Inevitably, the maximum torque the VCM 130 generates will be smaller, reducing the highest speed of the head. The power can indeed be saved, but the seek operation is impaired in terms of efficiency.

To enhance the operating efficiency of a disk drive, the disk must be accessed at high speed. The disk-accessing speed depends on the seek-operation speed. It is therefore demanded that the seek operation be performed at high speed. To shorten the seek-operation time, the torque of the VCM must be increased. However, the power-supply voltage the conventional VCM control circuit can supply to the VCM depends on the power-supply voltage applied from the host system. Inevitably, the largest current that can be supplied to the VCM is limited.

In the conventional VCM control circuit for use in a disk drive, the maximum current applied to the VCM cannot be increased above the rated value in order to increase the torque of the VCM. Hence, it is impossible to increase the seek-operation speed, or shorten the seek-operation time, thereby to enhance the operating efficiency of the disk drive. Further, maximum current supplied to the VCM decreases when the power-supply voltage applied to the VCM control circuit is switched to a low voltage because the host system is set into the low power-consumption mode. In this case, too, the torque of the VCM decreases, lowering the seek-operation speed. This will prolong the seek operation.

BRIEF SUMMARY OF THE INVENTION

An object of this invention is to provide a voice coil motor control system that increases the power-supply voltage applied to a disk drive, thereby increasing the maximum current supplied to the VCM provided in the drive, moving the head at higher speed and, ultimately, shortening the seek-operation time.

Another object of the invention is to provide a voice coil motor control system that increases the power-supply voltage applied to a disk drive when this power-supply voltage applied is switched to a low voltage, thereby preventing the maximum current supplied to the VCM from decreasing to lower the speed at which the head moves or to prolong the seek operation.

A voice coil motor control according to this invention is designed to control the voice coil motor for driving a head actuator provided in a disk drive. The apparatus comprises: a power supply circuit for receiving power from an external apparatus and outputting a prescribed power-supply voltage for driving the voice coil motor; a voltage step-up circuit for increasing the power-supply voltage output from the power supply circuit, thereby to output an increased voltage; voltage control means for selecting one of the increased voltage and the power-supply voltage under predetermined conditions; drive current generating means for generating a drive current in accordance with the voltage selected by the voltage control means; and a motor drive controller for supplying a drive current to the voice coil motor to drive the voice coil motor.

The voltage step-up circuit increases the power-supply voltage applied from the host system to the disk drive, and the voltage increased is used as the power-supply voltage of the voice coil motor (VCM). The maximum current that can flow in the VCM is thereby increased. The power-supply voltage for the VCM can be raised in the disk drive even if the power-supply voltage applied to the disk drive falls when the host system is set into a power-saving mode. The VCM can therefore keep generating the rated torque, moving the head at the prescribed seek-operation speed. As long as the power-supply voltage applied to the disk drive remains at a prescribed voltage, the seek-operation time can be shortened. This helps to enhance the performance of the disk drive.

Preferably, the voltage step-up circuit is a charging-pump type that has a capacitor. The charging-pump type circuit is small, making it possible to render the disk drive more compact than in the case where the voltage step-up circuit is of any other type.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the major components of a VCM control circuit that is the first embodiment of the present invention;

DETAILED DESCRIPTION OF THE INVENTION

Embodiments of this invention will be described, with reference to the accompanying drawings.

(Disk Drive)

Figure 4:
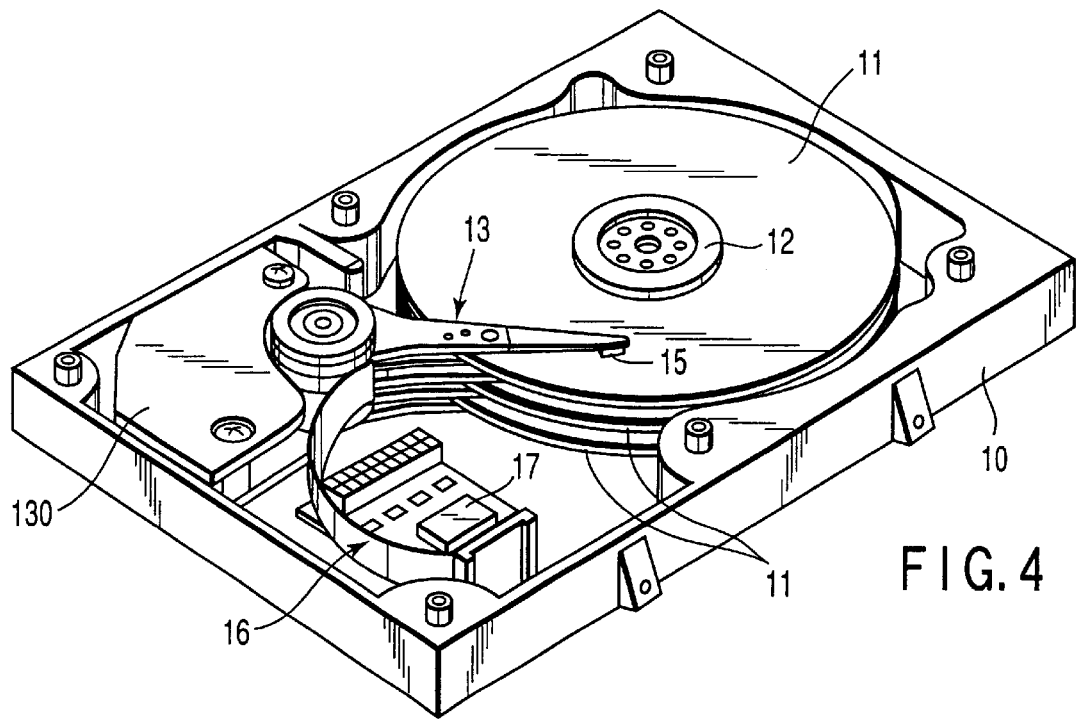
FIG. 4 is a perspective view of a disk drive which may incorporate any one of the first to third embodiments of the invention.
Figure 5:
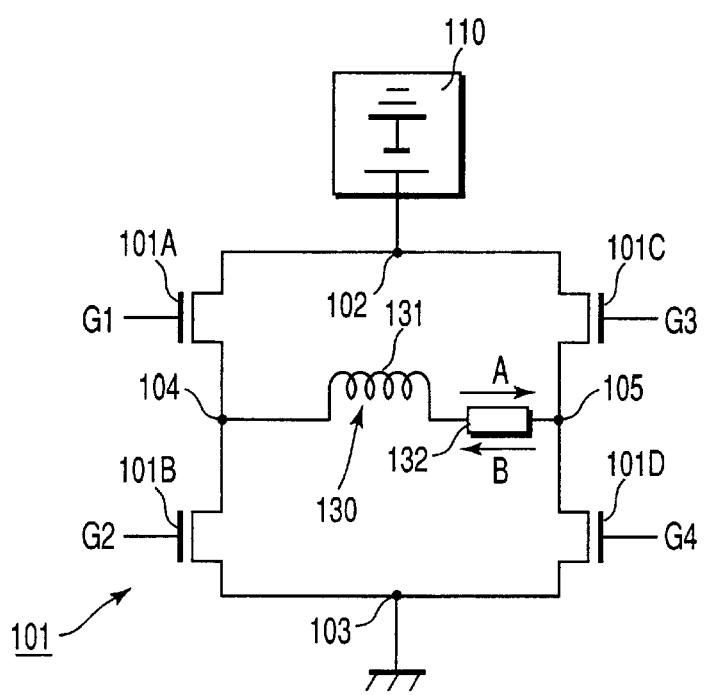
FIG. 5 is a block diagram of a conventional VCM control circuit.

FIG. 4 shows a disk drive which may incorporate any one of the first to third embodiments of the invention, which will be described later.

The disk drive comprises a case 10 and a top cover (not shown). The case 10 is a rectangular box made of metal and opening at the top. The top cover is fastened to the top of the case 10 by screws, closing the opening of the case 10.

The disk drive further comprises three disks 11, a spindle motor (SPM) 12, a rotary-type head actuator 13, and a flexible printed circuit (FPC) board 16, all contained in the case 10. The disks 11 are used as magnetic recording media. The SPM 12 is provided to rotate the disks 11. The head actuator 13 is designed to move the magnetic heads 15. The number of disks 11 is not limited to three. Rather, one disk or two disks may be provided in the case 10.

The head actuator 13 holds, at its distal end, the magnetic heads 15. Each magnetic head 15 faces one recording surface of one disk 11. The heads move in the radial direction of the disks 11 as the head actuator 13 rotates. The head actuator 13 is driven by a voice coil motor (VCM) 130 that is provided in the case 10.

Circuit components, such as a head amplifier circuit 17, are mounted on the FPC board 16. The head amplifier circuit 17 is connected to the heads 15 by wiring patterns provided on the FPC board 16. The head amplifier circuit 17 selects one head 15. The circuit 17 can supply supplies write signals to the head 15 selected and can receive read signals from the head 15 selected and amplify the read signals.

A printed circuit board (PCB), which is not shown, is secured to the lower surface of the case 10 by means of screws. An SPM control circuit and a VCM control circuit are mounted on the PCB. The SPM control circuit controls the SPM 12 that is a major component of the disk drive. The VCM control circuit, which is an embodiment of the present invention, drives the VCM 130. A read/write channel, a disk controller and a microprocessor (CPU) are mounted on the PCB, too. The read/write channel processes signals in various ways. For example, it decodes the signals read from any head 15 and generates data, and generates write signals that are to be recorded on any disk 11. The disk controller functions as an interface for transferring commands and read/write data between the disks 11, on the one hand, and a host system, on the other. The disk controller controls the operation of reading data from the disks 11 and writing data on the disks 11, through the read/write channel. The CPU is the main control device provided in the disk drive. The CPU can control the power-supply voltage of the V&M control circuit.

(Structure of the First Embodiment)

FIG. 1 shows the major components of the VCM control circuit, which is the first embodiment of the invention and which is designed for use in the disk drive illustrated in FIG. 4.

The VCM control circuit includes a VCM drive circuit 101. Like the conventional one shown in FIG. 4, the VCM drive circuit 101 has a switch circuit composed of four FETs 101A to 101D that are connected, forming an H-type bridge. The FETs 101A to 101D are turned on or off in accordance with switch control signals (i.e., gate control signals) G1 to G4. Each FET can control an electric current by virtue of on-resistance. A voltage step-up circuit 200 is provided between and connected to a power-supply circuit 110 and the node 102 of FETs 101A and 101C.

The output voltage of the voltage step-up circuit 200 (voltage increased), or the output voltage of the power supply circuit 110) is used as the power-supply voltage for the VCM 130. Thus, the power supply 110 serves as the voltage source for the VCM 130. The node 103 of the FETs 101B and 101D is connected to the ground as in the conventional VCM control circuit. The series circuit, which comprises the coil (VCM coil) 131 and sense resistor 132 of the VCM 130, is provided between and connected to the node 104 of the FETs 101A and 101B and the node 105 of the FETs 101C and 101D.

The power supply circuit 110 outputs a voltage at the same level as the voltage applied from a host system (e.g., a personal computer). The voltage step-up circuit 200 comprises a charging pump type circuit that has capacitors. Under the control of a CPU 201, the circuit 200, the circuit 200 outputs either the increased voltage or the voltage of the power supply circuit 110 (see FIGS. 2 and 3).

To supply a current to the VCM coil 131 so that the VCM 130 provided in the head actuator may generate a drive force, the FETs 101A and 101D are turned on and the FETs 101B and 101C are turned off, thus making a current flow in the direction of arrow A. To make a current flow in the opposite direction, or in the direction of arrow B, the FETs 101A and 101D are turned off and the FETs 101B and 101C are turned on. The FETs 101A to 101D are turned on or off, in accordance with the level of the gate control signal (i.e., gate voltage) supplied from a switching controller.

(Operation of the First Embodiment)

In the disk drive, the CPU 201 performs a seek operation in order to read data from, or write data on, the disks 11. More precisely, the CPU 201 controls the VCM control circuit so that the heads 15 may move to target positions (tracks) on the disks 11. The CPU 201 supplies a control value (digital data) to the VCM control circuit through a DA converter 502. The control value corresponds to the VCM currents (target VCM currents) that are used to move the heads 15 at target speeds. The CPU 201 supplies, to the VCM control circuit, the data representing the direction in which the VCM current should flow.

In the VCM control circuit, a switching controller 202 controls the gates of the FETs 101A to 101D in accordance with the VCM current (control value) and the data representing the current flow direction, both supplied from the CPU 201. To be more specific, the switching controller 202 supplies one of gate voltages G1 to G4 to the gate of one of FETs 101A and 101D that make a pair and the gate of one of FETs 101B and 101C that make another pair. (Note that the gate voltages G1 to G4 are determined by the control value that the CPU 201 generates from the output (DAC) of a digital/analog converter.) Therefore, FET 101A or 101D is turned on, and FET 101B or 101C is turned off. As a result, a current (I), i.e. VCM-driving current, flows in the VCM coil 131.

The current (I) flowing in the VCM coil 131 is given as follows:

$$I=(VU-VB)/(RC+RS+RF)$$

where VU is the output voltage of the voltage step-up circuit 200, VB is the back electromotive force of the VCM 130, RC is the resistance of the VCM coil 131, RS is the resistance of the sense resistor 132, and RF is the sum of the on-resistances of two FETS. As indicated above, the on-resistance of each FET is determined by the gate voltage of the FET.

In the embodiment of FIG. 1, the voltage step-up circuit 200 raises the output voltage of the power supply circuit 110 to 5 V. Assume that the output voltage of the power supply circuit 110 is equal to the power-supply voltage applied from a host system 400. It is also assumed that the FETs 101A and 101D have a minimal on-resistance each, and that RC+RS+RF=12.5Ω, where RC is the resistance of the VCM coil 131, RS is the resistance of the sense resistor 132, and RF is the sum of the on-resistances of two FETs. Then, the maximum current that can flow in the VCM coil 131 of the VCM 130 is 400 mA (=5V/12.5), if the VCM 130 generates no back electromotive force.

In the host system 400, the power-supply voltage is switched to a low voltage when the operating mode is changed to the low power-consumption mode. Assume that the normal power-supply voltage of 5 V is changed to a low voltage of 3.3 V. In the disk drive, the power supply circuit 110 then outputs the low voltage of 3.3 V.

If the output voltage (3.3 V) of the power supply circuit 110 is used as the power-supply voltage of the VCM 130, the maximum current that may be supplied to the VCM 130 will be 264 mA (=3.3 V/12.5Ω). This current is much smaller than the maximum current of 400 mA that is supplied to the VCM 130 when the power-supply voltage is 5 V.

If the seek distance of the head 15 is relatively long, the maximum current is supplied to the VCM 130, thereby increasing the speed at which the head 15 moves and shortening the seek-operation time. The maximum current is small, however, if the power-supply voltage has been switched to a low voltage in the low power-consumption mode. Then, the maximum torque of the VCM 130 decreases, inevitably lowering the seek-operation speed. In other words, the seek-operation time, which should be as short as possible in the disk drive, becomes longer.

To supply prevent a decrease in the seek-operation speed, the voltage step-up circuit 200 raises the output voltage (3.3 V) of the power supply circuit 110 to 5 V in the present embodiment. The voltage thus raised (i.e., 5 V output from the circuit 200) is used as the power-supply voltage of the VCM 130. Hence, a maximum current of 400 mA (=5V/12.5Ω) can be supplied to the VCM coil 131 of the VCM 130.

Thus, a maximum current as large as in the case the power-supply voltage is 5 V can be supplied to the VCM coil 131 in the present embodiment. The VCM 130 can therefore generate as large a torque as is required in the normal operation of the disk drive. The seek-operation time would not increase at all.

(Modification)

The embodiment described above may be modified in that the voltage step-up circuit 200 increases the output voltage of the power supply circuit 110 to one (i.e., 7 V) that is higher than the normal voltage (5 V).

This modification is useful and effective to enhance the performance of the disk drive incorporated in the host system 400 if the power specification of the system 400 is limited to the normal voltage (i.e., 5 V).

To enhance the performance of the disk drive it is demanded that the seek-operation speed be raised to shorten the seek-operation time. In order to meet the demand, it is necessary to increase the torque of the VCM 130. It follows that the maximum current to supply to the VCM coil 131 must be increased. In short, it is required that the power-supply voltage of the VCM 130 be raised higher (to 7 V).

If the host system 400 is a mobile information apparatus, such as a notebook-type personal computer, its power specification is limited as indicated above. The power-supply voltage that the host system can supply to the disk drive is equal to or lower than the normal voltage (i.e., 5 V). It is therefore impossible to increase the maximum current for the VCM 131 in the disk drive.

The VCM control circuit of this invention can increase the output voltage of the power supply circuit 110, which accords with the power supplied from the host system 400, to a high voltage (7 V). The high voltage, thus obtained, can be used as the power-supply voltage of the VCM 130. The maximum current for the VCM 130 is thereby increased more than in the conventional VCM control circuit in which the power-supply voltage of 5 V is applied to the VCM 130. In the same resistance condition as specified above, the current I increases from 400 mA (=5V/12.5Ω) to 560 mA (=7V/12.5Ω). The torque of the VCM 130 therefore increases. As a result, the seek-operation speed rises, reliably reducing the seek-operation time.

(Structure of the Second Embodiment)

Figure 2:
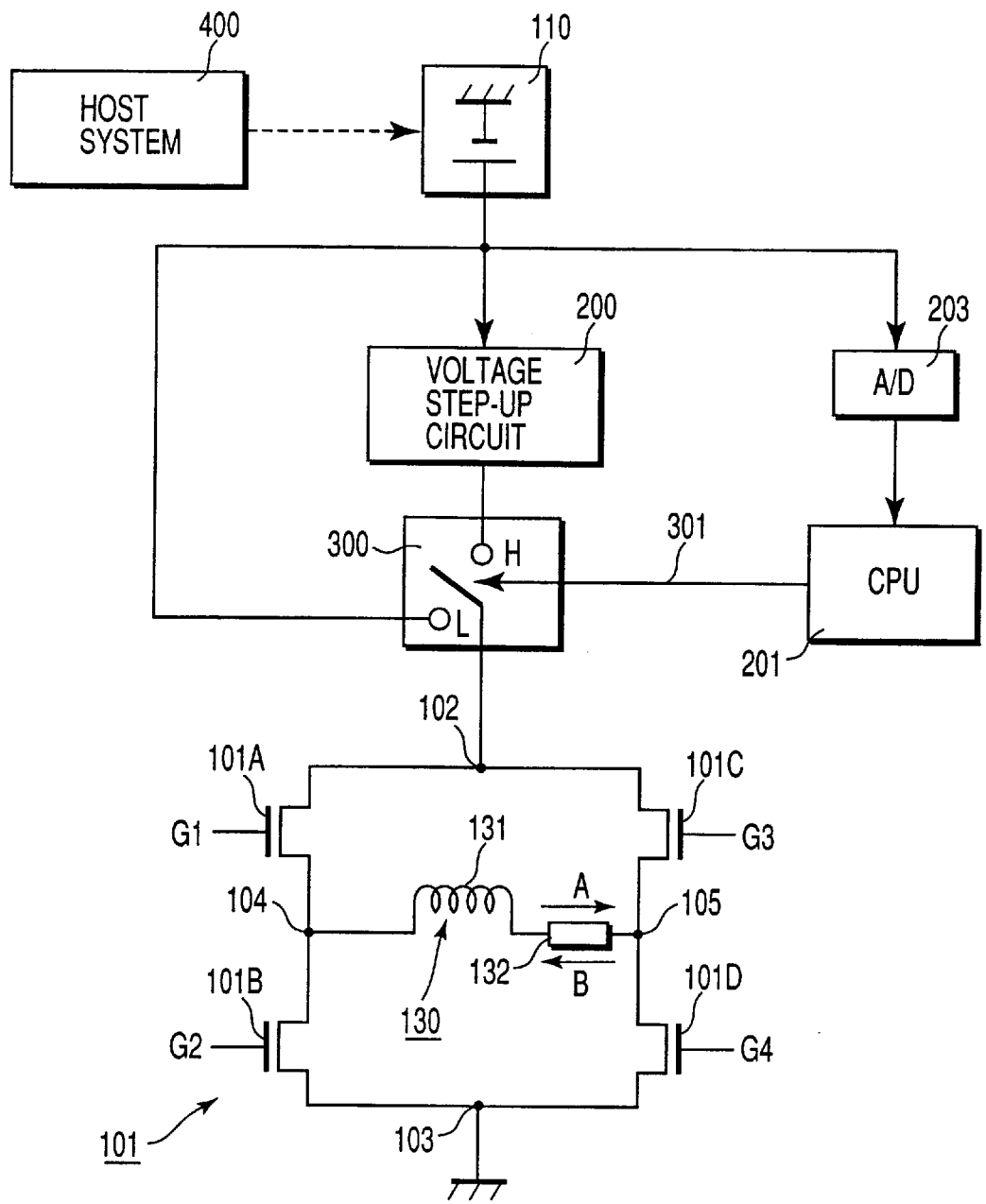
FIG. 2 is a block diagram illustrating the major components of a VCM control circuit that is the second embodiment of the invention.

FIG. 2 shows the major components of a VCM control circuit that is the second embodiment of the invention.

The second embodiment is characterized in two respects. First, the CPU 201 monitors the output voltage of the power supply circuit 110, by using an A/D converter 203. Second, the output voltage of the voltage step-up circuit 200 is used as the power-supply voltage for the VCM when the output voltage of the circuit 110 is switched to a low voltage.

More specifically, the CPU 201 selects the output voltage of the power supply circuit 110 and applies the same to the VCM drive circuit 101 if the voltage has the normal value of, for example, 5 V. The output voltage of the power supply circuit 110 may fall to a lower voltage (e.g., 3.3 V). In this case, the CPU 201 operates a switch circuit 300 to H, which selects the output voltage (5 V) of the voltage step-up circuit 200 and applies the same, as VCM power-supply voltage, to the VCM drive circuit 101. The CPU 201 monitors the power-supply voltage by applying the digital data the A/D converter 203 has generated from the output voltage of the power supply circuit 110.

In the second embodiment thus constructed, the output voltage of the voltage step-up circuit 200 is not always used as VCM power-supply voltage. Rather, it is used only when the output voltage of the circuit 110 is switched to L, a low voltage (e.g., 3.3 V). The power of the voltage step-up circuit 200 need to consume to increase the power-supply voltage can be saved.

In the second embodiment, the switch circuit 300 may select the output voltage (5 V) of the voltage step-up circuit 200, not only when the output voltage of the power supply circuit 110 falls to a lower voltage, but also when the CPU 201 determines that assumes a specific state. How the second embodiment operates will be described, with reference to the flowchart of FIG. 6.

Figure 6:
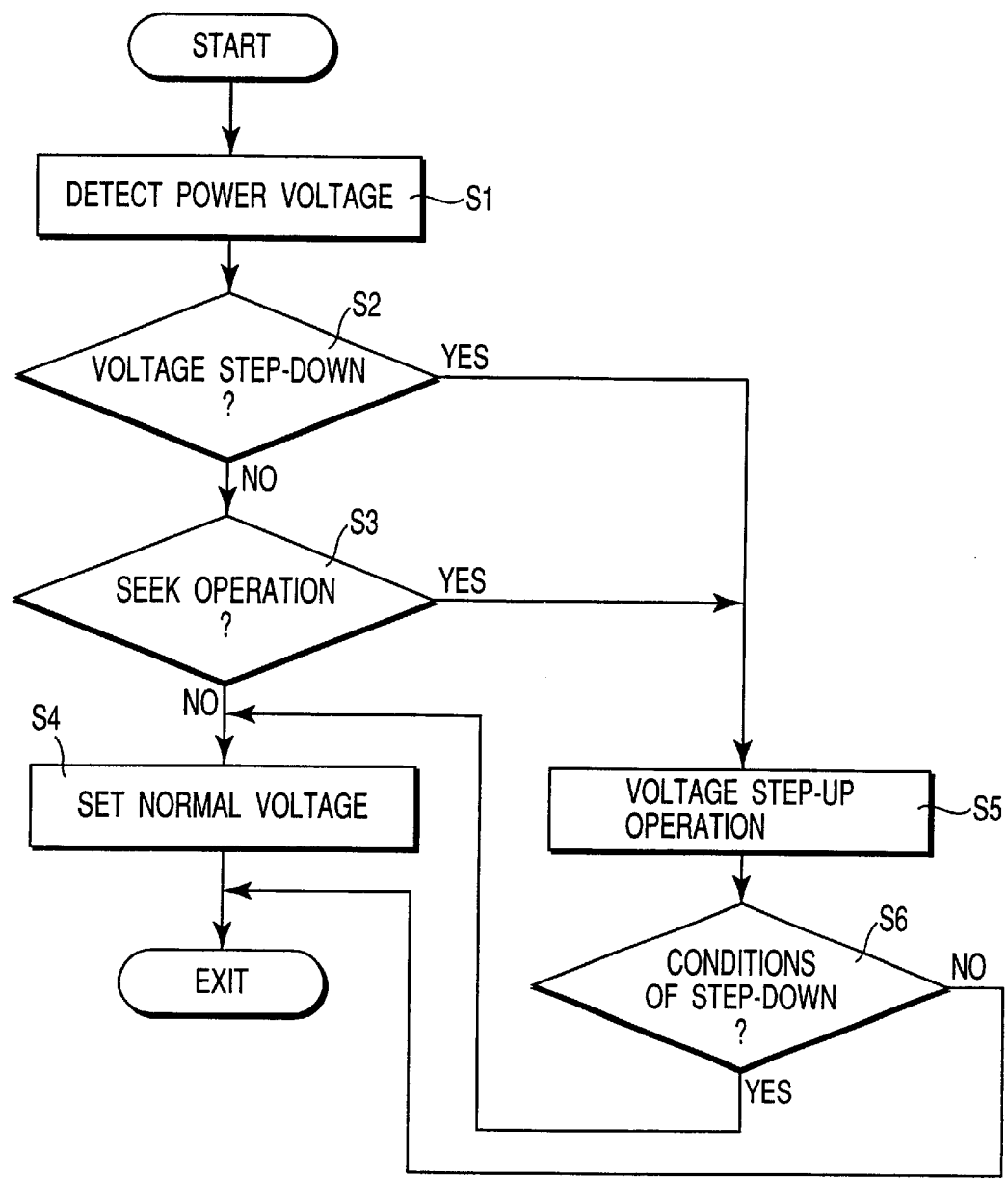
FIG. 6 is a flowchart explaining how the second embodiment controls the power-supply voltage applied to the VCM.

Step S1 and Step S2, shown in FIG. 6, are the controls the CPU 201 performs when the output voltage of the power supply circuit 110 falls.

In Step S3 it is determined whether the disk drive has started the seek operation. If YES, the CPU 201 operates the switch circuit 300 to H in Step S5, thus applying the output voltage (i.e., 7 V) of the voltage step-up circuit 200, as VCM power-supply voltage, to the VCM drive circuit 101. At a certain time in the initial stage of seek operation, the maximum current must flow in the VCM coil 131 to accelerate the VCM 130. Alternatively, the output voltage of the voltage step-up circuit 200 may be selected and applied, as VCM power-supply voltage, to the VCM drive circuit 101 until the rotation speed of the VCM 130 reaches the target value.

In Step S6 it is determined whether or not the above-mentioned resistance condition has been released or not. If YES, the operation goes to Step S4. In Step S4, the CPU 201 operates the switch circuit 300 to L, which selects and supplies the output voltage (normal voltage of 5 V) of the power supply circuit 110 to the VCM drive circuit 101. That is, the CPU 201 sets the VCM power-supply voltage back to the normal voltage when the speed of the VCM 130 reaches the target value upon lapse of a predetermined time in the initial phase of the seek operation or when the seek operation completes and the positioning operation starts.

Thus, the power-supply voltage increased by the voltage step-up circuit 200 can be used only if a current larger than the rated value needs to flow in the VCM coil 131 as the power-supply voltage of the VCM 130. If a small current (or a rated current) is sufficient as the current to flow in the VCM coil 131, the output voltage of the power supply circuit 110 may be used as the power-supply voltage of the VCM 130. The power the voltage step-up circuit 200 consumes can therefore be changed in accordance with the operating state of the disk drive. This helps to save power, achieving an efficient use of electric power.

The CPU 201 executes a control program, determining whether the current that should flow in the VCM 130, i.e., the target VCM current, is greater than a prescribed reference VCM current. If the target VCM current is greater than the reference VCM current, the CPU 201 generates a switching signal 301 of logic value "1." Otherwise, the CPU 201 generates a switching signal 301 of logic value "0." The switching signal 301 is supplied to the switch circuit 300.

If the switching signal has the logic value "1," the switch circuit 300 is switched to H and selects the voltage increased by the voltage step-up circuit 200 as the power-supply voltage for the VCM 130. If the switching signal has the logic value "0," the switch circuit 300 is switched to L and selects the voltage applied from the power supply circuit 110, as the power-supply voltage for the VCM 130.

Thus, a sufficiently large current can flow in the VCM 130 because the output voltage of the voltage step-up circuit 200 is supplied to the VCM 130 whenever necessary. When a large current need not flow in the VCM 130, the output current of the power supply circuit 110 is supplied to the VCM 130, thereby saving electric power.

(Third Embodiment)

Figure 3:
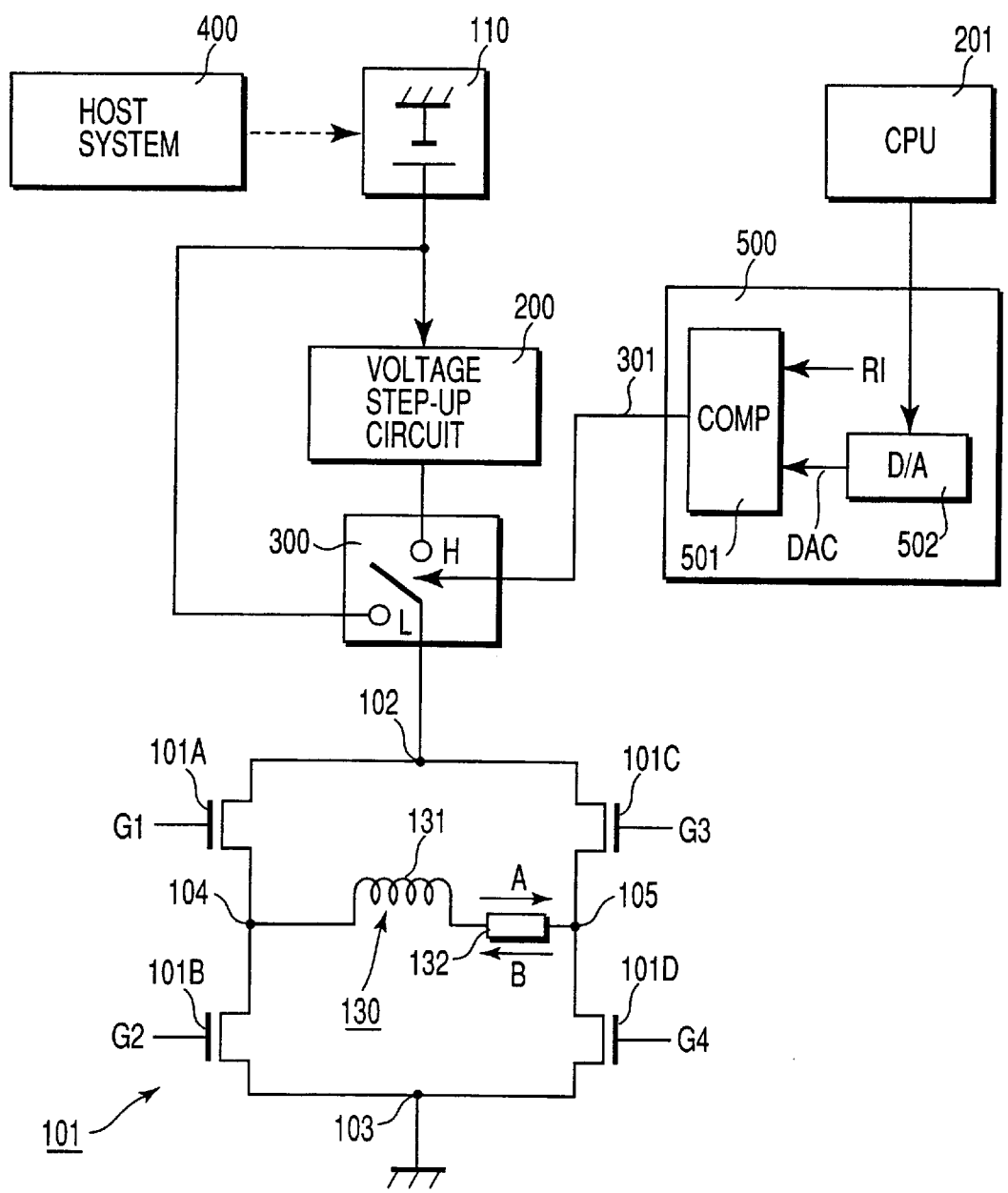
FIG. 3 is a block diagram depicting the major components of a VCM control circuit that is the third embodiment of the invention.

FIG. 3 illustrates the major components of a VCM control circuit that is the third embodiment of this invention.

The third embodiment is characterized in that the output (DAC) of the D/A converter 502 that depends on the control value output from the CPU 201 is utilized to switch the power-supply voltage for the VCM 130.

As shown in FIG. 3, this VCM control circuit comprises a switch control circuit 500 for controlling the switch circuit 300. The switch control circuit 500 has a comparator 501 and a D/A converter 502. The comparator 501 compares the output (DAC) of the D/A converter 502 with a reference VCM current RI, thereby determining whether the current that should flow in the VCM coil 131 is a large one or not. The switch control circuit 500 controls the switch circuit 300 in accordance with the result of the comparison the comparator 501 has performed.

The comparator 501 receives the DAC from the CPU 201. The DAC serves as a control value. The comparator 501 compares the absolute value of the current corresponding to the DAC with the reference VCM current RI. If the absolute value of the current is greater than the reference VCM current RI, the comparator 501 outputs a switching signal of logic value "1." Otherwise, the comparator 501 outputs a switching signal of logic value "0."

In the third embodiment, the switch control circuit 500 determines that the target VCM current is a large one if the current value (DAC) corresponding to the control value set by the CPU 201 is greater than the reference VCM current RI. In this case, the switch control circuit 500 generates a switching signal 301 of logic value "1," which is supplied to the switch circuit 300. In response to this switching signal, the switch circuit 300 is switched to H and selects the output voltage of the voltage step-up circuit 200, which will be used as the power-supply voltage for the VCM 130.

On the other hand, if the current value (DAC) corresponding to the control value is equal to or smaller than the reference VCM current RI, the switch control circuit 500 determines that the target VCM current is a small one. In this case, the switch control circuit 500 generates a switching signal 301 of logic value "0," which is supplied to the switch circuit 300. In response to this switching signal, the switch circuit 300 is switched to L and selects the output voltage of the power supply circuit 110, which will be used as the power-supply voltage for the VCM 130.

Hence, the output voltage of the voltage step-up circuit 200 (a relatively high voltage) is selected if a large current must flow in the VCM 130. A sufficiently large current can therefore flow in the VCM 130. If a large current need not flow in the VCM 130, the output voltage of the power supply circuit 100 (a relatively low voltage) is made to flow in the VCM 130. Thus, the power consumption in the voltage step-up circuit 200 can be reduced. In addition, the CPU 201 need not control the switch circuit 300 since the switch control circuit 500 is provided in the third embodiment.

(Voltage Step-up Circuit)

In normal condition the voltage step-up circuit 200 needs much time to sufficiently increase the output voltage of the power supply circuit 110. It is therefore desirable to set the circuit 200 in standby state so that the circuit 200 may start increasing the output voltage of the circuit 110 before the switch circuit 300 connects the circuit 300 to the VCM drive circuit 101. If the circuit 200 is so set in standby state, a sufficiently increased voltage can be applied from the circuit 200 to the VCM drive circuit 101 within a short time.

The voltage step-up circuit 200 may be either a switching type that has a coil or a charging-pump type that has a capacitor. The switching type is not appropriate if the VCM control circuit is a small one for use in a thin and small disk drive. This is because the coil has a relatively large height. In view of this, the charging-pump type having a capacitor is better if the VCM control circuit is to be incorporated in a thin and small disk drive.

All the embodiments are VCM control circuits that are described above are designed for use in magnetic disk drives. Nonetheless, they can be incorporated into other types of disk drives, such as optical disk drives.

As has been described in detail, the present invention provides a VCM control circuit in which the power-supply voltage applied to a disk drive is increased, thus increasing the maximum current for the VCM provided in the disk drive. The VCM control circuit can therefore increase the speed of moving the head in the disk drive, thereby to shorten the seek-operation time. Moreover, since the power-supply voltage applied to the disk drive is increased, the maximum current for the VCM can be prevented from decreasing to lower the speed of moving the head and ultimately lengthen the seek-operation time, even if the power-supply voltage applied to the disk drive is switched to a low voltage to save power in power-saving mode.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for controlling a voice coil motor for driving a head actuator provided in a disk drive, said apparatus comprising:

a power supply circuit that receives power from an external apparatus and outputs a prescribed power-supply voltage for driving the voice coil motor;

a voltage step-up circuit that increases the power supply voltage output from the power supply circuit, thereby to output an increased voltage;

a voltage controller that monitors the power-supply voltage and selects one of the increased voltage and the power-supply voltage, selecting the increased voltage when the power-supply voltage falls below a predetermined value;

drive current generating circuit that generates a drive current in accordance with the voltage selected by the voltage controller; and a motor drive controller that supplies the drive current to the voice coil motor to drive the voice coil motor.

2. The apparatus according to claim 1, wherein the voltage controller compares a control value of the voice coil motor with a reference control value and selects the increased voltage when the control value is greater than the reference control value, said control value determining the drive current that corresponds to a desired speed of moving the head actuator.

3. The apparatus according to claim 1, wherein the voltage controller selects the increased voltage for a prescribed time in an initial stage of driving the voice coil motor and selects the power-supply voltage upon lapse of the prescribed time.

4. The apparatus according to claim 1, wherein the voltage controller selects the increased voltage until a speed of the voice coil motor increases to a prescribed target value and selects the power-supply voltage when the speed of the voice coil motor reaches the prescribed target value.

5. The apparatus according to claim 1, wherein the voltage controller comprises:

a switching circuit that selects one of the increased voltage and the power-supply voltage; and a microprocessor that controls the switching circuit in accordance with the predetermined conditions.

6. The apparatus according to claim 1, wherein the voltage step-up circuit me a charging-pump type having a capacitor.

7. A disk drive having the apparatus according to claim 1, which comprises a head mounted on the head actuator and a head controller that performs a seek operation to move the head to a target position on the disk and that performs a positioning operation to position the head at the target position, and in which the voltage controller selects the increased voltage during the seek operation and selects the power-supply voltage during the positioning operation.

8. A disk drive having the apparatus according to claim 1, which comprises a head mounted on the head actuator and a head controller that performs a seek operation to move the head to a target position on the disk and that performs a positioning operation to position the head at the target position, and in which the voltage controller selects the increased voltage for a prescribed time in an initial stage of the seek operation and selects the power-supply voltage upon lapse of the prescribed time.

9. A disk drive having the apparatus according to claim 1, which comprises a head mounted on the head actuator and head controller that performs a seek operation to move the head to a target position on the disk and that performs a positioning operation to position the head at the target position, and a speed-determiner that determines a moving speed of the head actuator, and in which the voltage controller selects the increased voltage until the moving speed of the head actuator, determined by the speed-determiner, increases to a prescribed target value and selects the power-supply voltage when the moving speed of the head actuator reaches the prescribed target value.

10. A method of controlling a voice coil motor for driving a head actuator provided in a disk drive, said method comprising the steps of:

applying a power-supply voltage to a drive circuit designed to supply a drive current to the voice coil motor, during a normal operation of the disk drive, said power-supply voltage having been applied from an external apparatus;

increasing the power-supply voltage and applying the increased power-supply voltage to the drive circuit when the disk drive goes into predetermined conditions in which the drive current needs to be increased; and stopping application of the increased power-supply voltage to the drive circuit and starting application of the power-supply voltage thereto when the disk drive resumes the normal operation.

* * * * *